US011417910B2

United States Patent
Taguchi et al.

(10) Patent No.: US 11,417,910 B2
(45) Date of Patent: Aug. 16, 2022

(54) METHOD OF PRODUCING LAMINATE FOR NON-AQUEOUS SECONDARY BATTERY AND METHOD OF PRODUCING NON-AQUEOUS SECONDARY BATTERY

(71) Applicant: ZEON CORPORATION, Tokyo (JP)

(72) Inventors: Hiroyuki Taguchi, Tokyo (JP); Keiichiro Tanaka, Tokyo (JP); Yasuhiro Wakizaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/979,857

(22) PCT Filed: Mar. 20, 2019

(86) PCT No.: PCT/JP2019/011885
§ 371 (c)(1),
(2) Date: Sep. 11, 2020

(87) PCT Pub. No.: WO2019/188719
PCT Pub. Date: Oct. 3, 2019

(65) Prior Publication Data
US 2021/0050616 A1  Feb. 18, 2021

(30) Foreign Application Priority Data

Mar. 26, 2018 (JP) .............................. JP2018-058887

(51) Int. Cl.
*H01M 10/058* (2010.01)
*H01M 50/46* (2021.01)

(52) U.S. Cl.
CPC ....... *H01M 10/058* (2013.01); *H01M 50/461* (2021.01)

(58) Field of Classification Search
CPC ... H01M 50/46; H01M 50/461; H01M 50/449
See application file for complete search history.

(56) References Cited

U.S. PATENT DOCUMENTS

| 5,456,000 A | 10/1995 | Gozdz et al. |
| 5,540,741 A | 7/1996 | Gozdz et al. |
| 5,778,515 A * | 7/1998 | Menon ................ H01M 10/052 29/623.4 |
| 5,961,671 A | 10/1999 | Guindy et al. |
| 6,328,770 B1 * | 12/2001 | Gozdz ..................... H01M 4/04 29/623.3 |
| 2002/0050054 A1 | 5/2002 | Noh |
| 2006/0064868 A1 | 3/2006 | Tu |
| 2015/0188108 A1 * | 7/2015 | Miyazawa ............. H01G 11/52 156/60 |
| 2017/0117521 A1 | 4/2017 | Sasaki |
| 2019/0221811 A1 * | 7/2019 | Kim .................... H01M 50/449 |

FOREIGN PATENT DOCUMENTS

| EP | 1043796 A1 | 10/2000 |
| JP | 2001084985 A | 3/2001 |
| JP | 2012204303 A | 10/2012 |
| JP | 2013145763 A | 7/2013 |
| WO | 9931749 A1 | 6/1999 |
| WO | 2015198530 A1 | 12/2015 |

OTHER PUBLICATIONS

Sep. 29, 2020, International Preliminary Report on Patentability issued in the International Patent Application No. PCT/JP2019/011885.
Nov. 29, 2021, the Extended European Search Report issued by the European Patent Office in the corresponding European Patent Application No. 19775824.6.

\* cited by examiner

*Primary Examiner* — Stephan J Essex
(74) *Attorney, Agent, or Firm* — Kenja IP Law PC

(57) ABSTRACT

Provided is a method of efficiently producing a laminate for a non-aqueous secondary battery having excellent process adhesiveness. The method of producing a laminate for a non-aqueous secondary battery is a method of producing a laminate for a non-aqueous secondary battery including an electrode and a separator that are affixed to each other and includes: a step (A) of supplying, to at least one of an affixing surface of the electrode and an affixing surface of the separator, a substance that can plasticize a polymer contained in a surface layer part at an affixing surface side of at least one of the electrode and the separator; and a step (B) of affixing the electrode and the separator to each other after step (A).

5 Claims, No Drawings

METHOD OF PRODUCING LAMINATE FOR NON-AQUEOUS SECONDARY BATTERY AND METHOD OF PRODUCING NON-AQUEOUS SECONDARY BATTERY

TECHNICAL FIELD

The present disclosure relates to a method of producing a laminate for a non-aqueous secondary battery and a method of producing a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A non-aqueous secondary battery generally includes battery members such as a positive electrode, a negative electrode, and a separator that isolates the positive electrode and the negative electrode from each another and prevents short circuiting between the positive and negative electrodes.

In recent years, a technique of adhering an electrode and a separator through an adhesive layer to obtain a unified body so as to inhibit cell swelling and widening of the distance between electrode plates associated with repeated charging and discharging, and thereby improve electrical characteristics of a non-aqueous secondary battery, has been proposed with the aim of achieving even higher non-aqueous secondary battery performance (for example, refer to Patent Literature (PTL) 1 and 2).

Moreover, PTL 3, for example, proposes a method of producing a laminate for a secondary battery in which an electrode and a separator are well closely adhered to each other without increasing resistance between electrodes. In the proposed method, an adhesive resin solution obtained by dissolving an adhesive resin in a first solvent such as N-methylpyrrolidone is applied onto a separator, a second solvent (for example, water) in which solubility of the adhesive resin is lower than in the first solvent is subsequently supplied to the adhesive resin solution on the separator, and then a positive electrode and a negative electrode are affixed to the separator and drying is performed.

CITATION LIST

Patent Literature

PTL 1: JP2001-84985A
PTL 2: WO2015/198530A1
PTL 3: WO99/31749A1

SUMMARY

Technical Problem

When an electrode and a separator are stacked and unified to obtain a laminate for a secondary battery in a production process of a secondary battery and when the obtained laminate for a secondary battery is cut or transported, misalignment of the electrode and the separator, or the like, may occur, leading to problems such as the occurrence of faults and reduction of productivity. Therefore, it is desirable that an electrode and a separator are well adhered in a laminate for a non-aqueous secondary battery even before immersion in electrolyte solution (i.e., that the laminate for a non-aqueous secondary battery has excellent process adhesiveness).

However, a conventional laminate for a non-aqueous secondary battery such as described above leaves room for improvement in terms of further improving process adhesiveness.

Accordingly, one object of the present disclosure is to provide a method of efficiently producing a laminate for a non-aqueous secondary battery having excellent process adhesiveness.

Another object of the present disclosure is to provide a method of efficiently producing a non-aqueous secondary battery using a laminate for a non-aqueous secondary battery having excellent process adhesiveness.

Solution to Problem

The inventors conducted diligent investigation with the aim of solving the problems set forth above. The inventors discovered that a laminate for a non-aqueous secondary battery having excellent process adhesiveness is efficiently obtained by plasticizing a polymer that is used to adhere an electrode and a separator when affixing the electrode and the separator to each other. In this manner, the inventors completed the present disclosure.

Specifically, the present disclosure aims to advantageously solve the problems set forth above, and a presently disclosed method of producing a laminate for a non-aqueous secondary battery is a method of producing a laminate for a non-aqueous secondary battery including an electrode and a separator that are adhered to each other and comprises: a step (A) of supplying, to at least one of an affixing surface of the electrode and an affixing surface of the separator, a substance that can plasticize a polymer contained in a surface layer part at an affixing surface side of at least one of the electrode and the separator; and a step (B) of affixing the electrode and the separator to each other after the step (A). By supplying the substance that can plasticize the polymer (hereinafter, also referred to simply as "the substance") to at least one of the affixing surfaces and subsequently performing affixing, the electrode and the separator can be adhered using the plasticized polymer, and thus a laminate for a non-aqueous secondary battery having excellent process adhesiveness can be efficiently obtained.

In the presently disclosed method of producing a laminate for a non-aqueous secondary battery, the polymer preferably has a degree of swelling in response to the substance of not less than 110% and not more than 2,000%. When the degree of swelling of the polymer in response to the substance that can plasticize the polymer is within the range set forth above, process adhesiveness of a laminate for a non-aqueous secondary battery can be sufficiently increased.

Note that the "degree of swelling of the polymer" referred to in the present disclosure can be measured by a method described in the EXAMPLES section of the present specification.

In the presently disclosed method of producing a laminate for a non-aqueous secondary battery, the substance is preferably supplied in an amount of not less than 0.005 g/m$^2$ and not more than 5 g/m$^2$ in the step (A). When the supplied amount of the substance is within the range set forth above, process adhesiveness of a laminate for a non-aqueous secondary battery can be sufficiently increased while also inhibiting deterioration of battery characteristics of a non-aqueous secondary battery in which the laminate for a non-aqueous secondary battery is used.

In the presently disclosed method of producing a laminate for a non-aqueous secondary battery, it is preferable that the separator contains a polymer in a surface layer part at an affixing surface side, and adhesive force between the affixing surface of the separator and the same before supply of the substance in the step (A) is 8 N/m or less. In a case in which a separator containing a polymer in a surface layer part at an affixing surface side is used, it is possible to inhibit sticking (blocking) of the separator via the affixing surface thereof during storage or transport through the adhesive force between the affixing surface and the same being 8 N/m or less before supply of the substance that can plasticize the polymer.

Note that the "adhesive force between the affixing surface and the same before supply of the substance" referred to in the present disclosure can be measured by a method described in the EXAMPLES section of the present specification.

In the presently disclosed method of producing a laminate for a non-aqueous secondary battery, it is preferable that adhesive force between the electrode and the separator after supply of the substance in the step (A) is at least 1.2 times adhesive force between the electrode and the separator before supply of the substance in the step (A). When the ratio of adhesive force before and after supply of the substance that can plasticize the polymer (adhesive force after supply/adhesive force before supply) is not less than the lower limit set forth above, process adhesiveness of a laminate for a non-aqueous secondary battery can be sufficiently increased.

Note that "adhesive force between the electrode and the separator before supply of the substance" and "adhesive force between the electrode and the separator after supply of the substance" referred to in the present disclosure can each be measured by a method described in the EXAMPLES section of the present specification.

Moreover, the present disclosure aims to advantageously solve the problems set forth above, and a presently disclosed method of producing a non-aqueous secondary battery comprises: a step of producing a laminate for a non-aqueous secondary battery using any one of the methods of producing a laminate for a non-aqueous secondary battery set forth above; and a step of assembling a non-aqueous secondary battery using the laminate for a non-aqueous secondary battery and an electrolyte solution. By using a laminate for a non-aqueous secondary battery having excellent process adhesiveness that is produced by any one of the methods of producing a laminate for a non-aqueous secondary battery set forth above in this manner, a non-aqueous secondary battery that can display excellent performance is efficiently obtained.

Advantageous Effect

Through the presently disclosed method of producing a laminate for a non-aqueous secondary battery, it is possible to efficiently obtain a laminate for a non-aqueous secondary battery having excellent process adhesiveness.

Moreover, through the presently disclosed method of producing a non-aqueous secondary battery, a non-aqueous secondary battery that can display excellent performance is efficiently obtained using a laminate for a non-aqueous secondary battery having excellent process adhesiveness.

DETAILED DESCRIPTION

The following provides a detailed description of embodiments of the present disclosure.

The presently disclosed method of producing a laminate for a non-aqueous secondary battery is used in production of a laminate for a non-aqueous secondary battery including an electrode (positive electrode and/or negative electrode) and a separator that are affixed to each other. Moreover, a laminate for a non-aqueous secondary battery that is produced using the presently disclosed method of producing a laminate for a non-aqueous secondary battery can be used, for example, in production of a non-aqueous secondary battery using the presently disclosed method of producing a non-aqueous secondary battery.

(Method of Producing Laminate for Non-Aqueous Secondary Battery)

The presently disclosed method of producing a laminate for a non-aqueous secondary battery is a method of affixing an electrode and a separator, at least one of which contains a polymer in a surface layer part at an affixing surface side, to produce a laminate for a non-aqueous secondary battery. In the presently disclosed method of producing a laminate for a non-aqueous secondary battery, a substance that can plasticize the polymer is supplied to at least one of an affixing surface of the electrode and an affixing surface of the separator (step (A)), and then the electrode and the separator are affixed to each other (step (B)) to obtain a laminate for a non-aqueous secondary battery. By affixing the electrode and the separator to each other after the substance has been supplied in this manner, the plasticized polymer can display sufficient adhesive force, and a laminate for a non-aqueous secondary battery having excellent process adhesiveness can be obtained without performing an operation such as lengthening the pressing time during affixing, for example.

<Laminate for Non-Aqueous Secondary Battery>

The laminate for a non-aqueous secondary battery is a laminate in which the electrode and the separator are affixed to each other via affixing surfaces. The electrode that is affixed to the separator and is a constituent of the laminate for a non-aqueous secondary battery may be just a positive electrode, just a negative electrode, or both a positive electrode and a negative electrode. Moreover, in a case in which both a positive electrode and a negative electrode are affixed to a separator to obtain the laminate for a non-aqueous secondary battery, the number of positive electrodes, the number of negative electrodes, and the number of separators included in the laminate for a non-aqueous secondary battery may be 1 or may be 2 or more.

In other words, the structure of the laminate for a non-aqueous secondary battery that is produced using the presently disclosed production method may be any of the following structures (1) to (4).

(1) Positive electrode/Separator
(2) Negative electrode/Separator
(3) Positive electrode/Separator/Negative electrode
(4) Structure in which positive electrodes and negative electrodes are stacked alternately with separators in-between (for example, "positive electrode/separator/negative electrode/separator/positive electrode . . . /separator/negative electrode", etc.)

<Electrode>

The electrode is not specifically limited and can, for example, be an electrode formed of an electrode substrate including an electrode mixed material layer formed at one side or both sides of a current collector or an electrode further including a porous membrane layer and/or an adhesive layer formed on an electrode mixed material layer of an electrode substrate. Note that in a case in which a laminate having structure (4) is produced, each electrode other than a positive electrode and a negative electrode that are positioned at both stacking direction ends is normally an electrode including electrode mixed material layers formed at both sides of a current collector.

The current collector, electrode mixed material layer, porous membrane layer, and adhesive layer are not specifically limited and can be any current collector, electrode mixed material layer, porous membrane layer, and adhesive layer that can be used in the field of non-aqueous secondary batteries, such as any of those described in JP2013-145763A, for example.

<Separator>

The separator is not specifically limited and can, for example, be a separator formed of a separator substrate or a separator including a porous membrane layer and/or an adhesive layer formed at one side or both sides of a separator substrate.

The separator substrate, porous membrane layer, and adhesive layer are not specifically limited and can be any separator substrate, porous membrane layer, and adhesive layer that can be used in the field of non-aqueous secondary batteries, such as any of those described in JP2012-204303A and JP2013-145763A, for example.

<Polymer>

The polymer is a polymer that is plasticized by the substance supplied in step (A), which is described in detail further below, and is present in at least one of a surface layer part at the affixing surface side of the electrode and a surface layer part at the affixing surface side of the separator.

Note that the polymer present in the surface layer part may be just one type of polymer or two or more types of polymers. Moreover, the surface layer part where the polymer is present may contain polymers other than the polymer that is plasticized by the substance (hereinafter, also referred to as "other polymers").

In a case in which the polymer is present in the surface layer part at the affixing surface side of the electrode, the polymer is normally present in an electrode mixed material layer in a case in which the electrode is formed of an electrode substrate and is normally present in a porous membrane layer or adhesive layer located at the outermost surface of the electrode in a case in which the electrode further includes a porous membrane layer and/or an adhesive layer formed on an electrode mixed material layer of an electrode substrate.

Moreover, in a case in which the polymer is present in the surface layer part at the affixing surface side of the separator, the polymer is present in a porous membrane layer or adhesive layer located at the outermost surface of the separator in a case in which the separator includes a porous membrane layer and/or an adhesive layer formed on a separator substrate.

The polymer is not specifically limited so long as it can be plasticized by the substance. For example, the polymer can be any polymer that can be used in the field of secondary batteries such as an acrylic polymer (polymer including mainly a (meth)acrylic acid alkyl ester monomer unit); a fluoropolymer (polymer including mainly a fluorine-containing monomer unit) such as polyvinylidene fluoride (PVdF) or polyvinylidene fluoride-hexafluoropropylene (PVdF-HFP) copolymer; an aliphatic conjugated diene/aromatic vinyl copolymer (polymer including mainly an aliphatic conjugated diene monomer unit and an aromatic vinyl monomer unit) such as styrene-butadiene copolymer (SBR), or a hydrogenated product thereof; an aliphatic conjugated diene/acrylonitrile copolymer such as butadiene-acrylonitrile copolymer (NBR), or a hydrogenated product thereof; or a polyvinyl alcohol polymer such as polyvinyl alcohol (PVA).

Known monomers can be used as various monomers that can form the monomer units described above. Note that when a polymer is said to "mainly include" one type of monomer unit or a plurality of types of monomers units in the present disclosure, this means that "when the amount of all monomer units included in the polymer is taken to be 100 mass %, the proportional content of the one type of monomer unit or the total proportional content of the plurality of types of monomer units is more than 50 mass %". Moreover, in the present disclosure, "(meth)acrylic acid" is used to indicate "acrylic acid" and/or "methacrylic acid".

One of the polymers described above may be used individually, or two or more of the polymers described above may be used in combination.

Of these examples, it is preferable that a polymer having a glass-transition temperature of 30° C. or higher (hereinafter, also referred to as a "high-Tg polymer") is included as the polymer, and more preferable that both a polymer having a glass-transition temperature of 30° C. or higher and a polymer having a glass-transition temperature of lower than 30° C. (hereinafter, also referred to as a "low-Tg polymer") are included as the polymer. The inclusion of a high-Tg polymer as the polymer can inhibit the display of excessive adhesive force by the polymer present in the surface layer part of a battery member (electrode and/or separator) at normal temperature (23° C.) and can inhibit blocking during storage or transport of battery members containing the polymer in the surface layer part thereof. Moreover, the inclusion of both a high-Tg polymer and a low-Tg polymer can inhibit blocking of the battery member containing the polymer in the surface layer part thereof while also inhibiting detachment of the polymer and the like from the surface layer part. From a viewpoint of further increasing blocking resistance of the battery member, the glass-transition temperature of the high-Tg polymer is preferably 35° C. or higher, and more preferably 40° C. or higher. Moreover, from a viewpoint of causing the polymer to display excellent adhesiveness even in electrolyte solution, the glass-transition temperature of the high-Tg polymer is preferably 110° C. or lower, more preferably 90° C. or lower, and even more preferably 60° C. or lower. Also, from a viewpoint of ensuring blocking resistance of the battery member, the glass-transition temperature of the low-Tg polymer is preferably −75° C. or higher, more preferably −55° C. or higher, and even more preferably −35° C. or higher. Furthermore, from a viewpoint of inhibiting detachment of components such as the polymer from the battery member, the glass-transition temperature of the low-Tg polymer is preferably 20° C. or lower, and more preferably 15° C. or lower.

The "glass-transition temperature" referred to in the present disclosure can be measured by a method described in the EXAMPLES section.

In a case in which both a high-Tg polymer and a low-Tg polymer are included as the polymer, the content of the low-Tg polymer in the surface layer part per 100 parts by mass of the high-Tg polymer is preferably 10 parts by mass or more, more preferably 25 parts by mass or more, and even more preferably 30 parts by mass or more, and is preferably 70 parts by mass or less, more preferably 50 parts by mass or less, and even more preferably 40 parts by mass or less. When the content of the low-Tg polymer is not less than any of the lower limits set forth above, detachment of components such as the polymer from the battery member can be sufficiently inhibited. Moreover, when the content of the low-Tg polymer is not more than any of the upper limits set forth above, sufficient blocking resistance of the battery member can be ensured.

Note that in a case in which a polymer that includes a high-Tg polymer is present in a porous membrane layer containing non-conductive particles such as described in JP2013-145763A, for example, that is located at an outermost surface of the separator, the content of the previously described high-Tg polymer per 100 parts by mass of the non-conductive particles is preferably not less than 1 part by mass and not more than 100 parts by mass, and more preferably not less than 1 part by mass and not more than 25 parts by mass. When the content of the high-Tg polymer is within any of the ranges set forth above, adhesive force can be sufficiently increased while also causing the porous membrane to display an expected function thereof.

For the same reason, the proportional content of the high-Tg polymer per 100 volume % of the non-conductive particles is preferably 5 volume % or more, and more preferably 10 volume % or more, and is preferably 100 volume % or less, and more preferably 80 volume % or less.

Moreover, in a case in which a polymer that includes both a high-Tg polymer and a low-Tg polymer is present in a porous membrane layer containing non-conductive particles, the content of the previously described low-Tg polymer per 100 mass %, in total, of the non-conductive particles and the high-Tg polymer is preferably 0.1 mass % or more, more preferably 0.2 mass % or more, and even more preferably 0.5 mass % or more, and is preferably 20 mass % or less, more preferably 15 mass % or less, and even more preferably 10 mass % or less.

The polymer described above may be in a particulate form or a non-particulate form. Moreover, the polymer may be a composite polymer such as a polymer having a core-shell structure.

In a case in which the polymer has a particulate form, the volume-average particle diameter D50 of the polymer is preferably 0.1 μm or more, more preferably 0.12 μm or more, and even more preferably 0.15 μm or more, and is preferably 1 μm or less, more preferably 0.9 μm or less, and even more preferably 0.8 μm or less. When the volume-average particle diameter D50 of the polymer is not less than any of the lower limits set forth above, an increase in internal resistance of the laminate can be suppressed, and output characteristics of a secondary battery in which the laminate is used can be improved. On the other hand, when the volume-average particle diameter D50 of the polymer is not more than any of the upper limits set forth above, adhesiveness of the polymer in electrolyte solution can be increased, and cycle characteristics of a secondary battery can be improved.

Note that the volume-average particle diameter D50 of the polymer can be measured using a measurement method described in the EXAMPLES section of the present specification.

The polymer described above can be produced without any specific limitations by, for example, polymerizing a monomer composition containing monomers that can form various monomer units. The proportional content of each monomer in the monomer composition can be set in accordance with the proportional content of each repeating unit (monomer unit) in the polymer. Moreover, a polymer having a core-shell structure can be produced by, for example, stepwise polymerization in which the ratio of monomers for a polymer of a core portion and monomers for a polymer of a shell portion is changed over time. Specifically, a polymer having a core-shell structure can be produced by continuous, multi-step emulsion polymerization or multi-step suspension polymerization in which a polymer formed in a preceding step is then covered by a polymer formed in a succeeding step.

The polymerization method is not specifically limited, and a method such as solution polymerization, suspension polymerization, bulk polymerization, or emulsion polymerization can be used. Moreover, ionic polymerization, radical polymerization, living radical polymerization, or the like can be adopted as the polymerization reaction. In the polymerization, seed particles may be used to perform seeded polymerization. The polymerization conditions can be set as appropriate depending on the polymerization method and so forth.

Moreover, additives such as emulsifiers, polymerization initiators, polymerization aids, dispersion stabilizers, and co-stabilizers can be used in the polymerization in an amount that is the same as typically used.

<Substance>

So long as the substance can plasticize the polymer, it may be a substance that is a solid at normal temperature (23° C.) and normal pressure (1 atm) or a substance that is a liquid at normal temperature (23° C.) and normal pressure (1 atm). In particular, the substance is preferably a substance that is a liquid at normal temperature (23° C.) and normal pressure (1 atm) from a viewpoint that such a substance is easy to uniformly supply to the affixing surface of a battery member (electrode and/or separator).

The phrase "can plasticize the polymer" as used in the present disclosure refers to lowering the glass-transition temperature of the polymer.

Note that although this is dependent on the type of polymer that is present in the surface layer part of the battery member, the substance that is a solid at normal temperature (23° C.) and normal pressure (1 atm) may be an aromatic compound such as benzophenone, benzylaniline, methoxybiphenyl, or phenoxyaniline, for example.

Moreover, the substance that is a liquid at normal temperature (23° C.) and normal pressure (1 atm) may be an alcohol such as isopropyl alcohol; a carbonate such as propylene carbonate; a terpene such as limonene or cymene; a cyclic hydrocarbon such as cyclohexane; a chain hydrocarbon such as heptane; an ester compound such as ethyl acetate or butyl acetate; an aromatic compound such as aniline, ethylbenzene, benzene, or xylene; an ether compound such as diethylene glycol monobutyl ether or ethylene glycol monobutyl ether; a nitrile such as acetonitrile; a ketone such as acetone; or the like, for example. Of these substances, terpenes such as limonene and cymene are preferable from a viewpoint of safety.

One of the substances described above may be used individually, or two or more of the substances described above may be used as a mixture in a freely selected ratio.

The boiling point of the substance at normal pressure (1 atm) is preferably 70° C. or higher, more preferably 100° C. or higher, and even more preferably 120° C. or higher. When the boiling point of the substance is not lower than any of the lower limits set forth above, reduction of process adhesiveness of the laminate for a non-aqueous secondary battery through volatilization of the substance can be suppressed, and the laminate for a non-aqueous secondary battery can be caused to display excellent process adhesiveness over a long period.

Moreover, the substance can preferably cause swelling or dissolution of the previously described polymer. Specifically, the degree of swelling of the polymer in response to the substance as measured by a method described in the EXAMPLES section is preferably not less than 110% and not more than 2,000%, more preferably not less than 150% and not more than 2,000%, even more preferably not less than 200% and not more than 2,000%, particularly preferably not less than 500% and not more than 2,000%, and even further preferably not less than 500% and not more than 1,000%. By using a substance for which the degree of swelling of the polymer is within any of the ranges set forth above, the polymer can be sufficiently plasticized while maintaining a suitable elastic modulus, and thus process adhesiveness of the laminate for a non-aqueous secondary battery can be further increased.

<Step (A)>

In step (A), the substance described above is supplied to at least one of the affixing surface of the electrode and the affixing surface of the separator. Note that the affixing surface to which the substance is supplied is normally formed of a solid.

The battery member having the affixing surface to which the substance is supplied may be a battery member that does not have the previously described polymer present in the surface layer part thereof. This is because so long as the substance is supplied to at least one of the affixing surfaces that are to be joined to each other, the previously described polymer can be plasticized during affixing of the electrode and the separator to each other. Note that from a viewpoint of increasing process adhesiveness of the laminate for a non-aqueous secondary battery, it is preferable that the battery member having the affixing surface to which the substance is supplied is a battery member having the previously described polymer present in the surface layer part thereof.

In a case in which the substance is a solid at normal temperature (23° C.) and normal pressure (1 atm), the substance can be supplied to the affixing surface by a method such as sprinkling.

Moreover, in a case in which the substance is a liquid at normal temperature (23° C.) and normal pressure (1 atm), the substance can be supplied to the affixing surface by a method such as a direct application method (bar coating, roll coating, dip coating, brush coating, etc.), a spraying method (spray coating, inkjet coating, etc.), or a vapor method.

The amount of the substance that is supplied to the affixing surface in step (A) is preferably 0.005 $g/m^2$ or more, more preferably 0.1 $g/m^2$ or more, even more preferably 0.2 $g/m^2$ or more, and particularly preferably 1 $g/m^2$ or more, and is preferably 5 $g/m^2$ or less, more preferably 4 $g/m^2$ or less, and even more preferably 3 $g/m^2$ or less. When the supplied amount of the substance is not less than any of the lower limits set forth above, process adhesiveness of the laminate for a non-aqueous secondary battery can be further increased. Moreover, when the supplied amount of the substance is not more than any of the upper limits set forth above, deterioration of battery characteristics of a secondary battery in which the laminate is used can be inhibited.

The temperature at which the substance is supplied to the affixing surface in step (A) is preferably 30° C. or lower, more preferably 28° C. or lower, and even more preferably 25° C. or lower from a viewpoint of inhibiting volatilization of the substance, and is normally 0° C. or higher.

<Step (B)>

In step (B), the affixing surfaces, at least one of which has been supplied with the substance, are overlapped so as to affix the electrode and the separator to each other. Note that affixing of the electrode and the separator to each other is performed without treatment such as drying of the substance that has been supplied to the affixing surface. The affixing is preferably performed 30 minutes or less, more preferably 10 minutes or less, even more preferably 5 minutes or less, and particularly preferably 1 minute or less after supply of the substance from a viewpoint of preventing volatilization of the supplied sub stance.

The affixing can, without any specific limitations, be performed through pressing and/or heating of the laminate in which the electrode and the separator are overlapped with the affixing surfaces therebetween, for example.

In a case in which the laminate is pressed in step (B), the pressure applied to the laminate is preferably 0.3 MPa or more, more preferably 0.5 MPa or more, and even more preferably 1.0 MPa or more, and is preferably 20 MPa or less, more preferably 15 MPa or less, and even more preferably 10 MPa or less.

The temperature during affixing of the electrode and the separator in step (B) is preferably 10° C. or higher, more preferably 20° C. or higher, even more preferably 30° C. or higher, and particularly preferably 40° C. or higher, and is normally 60° C. or lower. When the temperature is not lower than any of the lower limits set forth above, the separator and the electrode can be well adhered.

Moreover, the temperature of a central part of the laminate during the affixing is preferably 10° C. or higher, more preferably 20° C. or higher, and even more preferably 30° C. or higher. When the temperature of the central part of the laminate is not lower than any of the lower limits set forth above, the separator and the electrode can be well adhered.

The duration of pressing and/or heating of the laminate in step (B) is preferably 5 seconds or more, more preferably 10 seconds or more, and even more preferably 20 seconds or more, and is preferably 120 seconds or less, more preferably 100 seconds or less, and even more preferably 80 seconds or less. When the duration of pressing and/or heating of the laminate is not less than any of the lower limits set forth above, the separator and the electrode can be well adhered. Moreover, when the duration of pressing and/or heating of the laminate is not more than any of the upper limits set forth above, productivity of the laminate can be increased.

<Adhesive Force of Electrode and Separator>

In the presently disclosed method of producing a laminate for a non-aqueous secondary battery, the adhesive force between the electrode and the separator before supply of the substance in step (A) is preferably not less than 0 N/m and not more than 0.3 N/m, more preferably not less than 0 N/m and not more than 0.2 N/m, and even more preferably not less than 0 N/m and not more than 0.1 N/m. When the adhesive force between the electrode and the separator before supply of the substance is not more than any of the upper limits set forth above, sticking together (i.e., blocking) of adjacent battery members can be inhibited when a battery member such as the separator or the electrode is stored or transported in wound-up state or a stacked state. Consequently, the occurrence of faults and reduction of productivity can be inhibited.

Note that since the polymer is plasticized through supply of the substance to obtain process adhesiveness of the laminate in the presently disclosed method of producing a laminate for a non-aqueous secondary battery, the presently disclosed method of producing a laminate for a non-aqueous secondary battery makes it possible to obtain a laminate having excellent process adhesiveness without increasing adhesive force between the electrode and the separator before supply of the substance (i.e., without increasing the risk of blocking occurring).

In a case in which the polymer is present in at least the surface layer part at the affixing surface side of the separator in the presently disclosed method of producing a laminate for a non-aqueous secondary battery, the adhesive force between the affixing surface of the separator and the same before supply of the substance in step (A) is preferably 8 N/m or less, more preferably 6 N/m or less, and even more preferably 4 N/m or less. When the adhesive force between the affixing surface of the separator and the same is 8 N/m or less before supply of the substance that can plasticize the polymer, it is possible to inhibit sticking (blocking) of the separator via the affixing surface during storage or transport.

Moreover, in the presently disclosed method of producing a laminate for a non-aqueous secondary battery, the adhesive force between the electrode and the separator after supply of the substance in step (A) is preferably 0.5 N/m or more, more preferably 0.7 N/m or more, and even more preferably 1.0 N/m or more. When the adhesive force between the electrode and the separator after supply of the substance is not less than any of the lower limits set forth above, process adhesiveness of the obtained laminate can be sufficiently improved.

Furthermore, in the presently disclosed method of producing a laminate for a non-aqueous secondary battery, the adhesive force between the electrode and the separator after supply of the substance in step (A) is preferably at least 1.2 times the adhesive force between the electrode and the separator before supply of the substance in step (A), more preferably at least 1.6 times this adhesive force, even more preferably at least 2.6 times this adhesive force, and particularly preferably at least 10 times this adhesive force. When the ratio of the adhesive force between the electrode and the separator after supply of the substance relative to the adhesive force between the electrode and the separator before supply of the substance (adhesive force after supply/adhesive force before supply) is not less than any of the lower limits set forth above, process adhesiveness of the laminate for a non-aqueous secondary battery can be sufficiently increased.

(Method of Producing Non-Aqueous Secondary Battery)

The presently disclosed method of producing a non-aqueous secondary battery includes a step of producing a laminate for a non-aqueous secondary battery using the presently disclosed method of producing a laminate for a non-aqueous secondary battery set forth above and a step of assembling a non-aqueous secondary battery using the laminate for a non-aqueous secondary battery and an electrolyte solution (assembly step). The presently disclosed method of producing a non-aqueous secondary battery enables efficient production of a non-aqueous secondary battery that can display excellent performance as a result of a laminate for a non-aqueous secondary battery that has excellent process adhesiveness and is produced according to the presently disclosed method of producing a laminate for a non-aqueous secondary battery being used in the presently disclosed method of producing a non-aqueous secondary battery.

<Assembly Step>

The electrolyte solution is normally an organic electrolyte solution obtained by dissolving a supporting electrolyte in an organic solvent. For example, in a case in which the non-aqueous secondary battery is a lithium ion secondary battery, a lithium salt is used as the supporting electrolyte. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation, and $LiPF_6$ is particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

The non-aqueous secondary battery can be assembled by further stacking an additional battery member (electrode and/or separator, etc.) with the laminate for a non-aqueous secondary battery produced according to the presently disclosed method of producing a laminate for a non-aqueous secondary battery, as necessary, subsequently performing rolling, folding, or the like of the resultant laminate in accordance with the battery shape, as necessary, to place the laminate in a battery container, injecting the electrolyte solution into the battery container, and sealing the battery container. In order to prevent pressure increase inside the non-aqueous secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like, for example.

The adhesive force between the electrode and the separator in the electrolyte solution is preferably 0.5 N/m or more, more preferably 0.8 N/m or more, and even more preferably 1.0 N/m or more from a viewpoint of causing the obtained non-aqueous secondary battery to display excellent battery characteristics.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to measure and evaluate the glass-transition temperature, volume-average particle diameter D50, and degree of swelling in response to a substance of a polymer, the adhesive force between an affixing surface of a separator and the same, the dry adhesive force between an electrode and a separator, the adhesive force between an electrode and a separator in electrolyte solution, the process adhesiveness of a laminate, and the cycle characteristics of a secondary battery.

<Glass-Transition Temperature>

A water dispersion containing a polymer was dried in an environment having a humidity of 50% and a temperature of 23° C. to 25° C. for 3 days to obtain a film having a thickness of 1±0.3 mm. The film was dried in a 120° C. hot-air oven for 1 hour. Thereafter, the dried film was used as a sample to measure the glass-transition temperature of the polymer in accordance with JIS K7121, at a measurement temperature of −100° C. to 180° C. and a heating rate of 5° C./min, using a differential scanning calorimeter (DSC6220SII produced by Nanotechnology). Note that in a case in which the polymer had a core-shell structure, the glass-transition temperature of a polymer forming the core portion was measured.

<Volume-Average Particle Diameter D50>

The volume-average particle diameter D50 of a polymer in a dispersion liquid was measured using a laser diffraction/light scattering particle size distribution analyzer (LS230 produced by Beckman Coulter, Inc.).

<Degree of Swelling in Response to Substance>

A measurement target polymer was hot pressed under conditions of 100° C. and 20 kg/cm$^2$ for 5 minutes to produce a film having a thickness of 0.5 mm. Note that in a case in which the produced polymer was dispersed or dissolved in liquid, the polymer was loaded into a petri dish made from polytetrafluoroethylene, was dried at a temperature of 60° C. for 12 hours, and was subsequently removed from the petri dish, and then the dried polymer was pressed under the same conditions as described above to produce of 0.5 mm film.

A test specimen was obtained by cutting a 1 cm square from the obtained film. The weight of the test specimen was measured and was taken to be W0. The test specimen was brought into contact with a substance at a temperature of 23° C. for 2 hours. Thereafter, the specimen was removed, substance on the surface of the test specimen was wiped off, and the weight W1 of the test specimen after having been brought into contact with the substance was measured. These weights W0 and W1 were used to calculate the degree of swelling S (%) by S=(W1/W0)×100%.

<Adhesive Force Between Affixing Surface of Separator and the Same (Blocking Resistance)>

A separator was cut out as two pieces of 4 cm in width by 4 cm in length. Surfaces of the separators where a polymer was contained in the surface layer part (affixing surfaces) were overlapped and were pressed at a temperature of 40° C. and a pressure of 8 MPa for 2 minutes. Thereafter, the stress when the overlapped separators were peeled apart by pulling vertically upward at a pulling speed of 50 mm/min (i.e., adhesive force between the affixing surfaces of the separators) was measured.

<Dry Adhesive Force>

A negative electrode and a separator were pressed under the same conditions as in production of a laminate to affix the negative electrode and the separator to each other and were then cut to 1 cm in width by 5 cm in length to obtain a test specimen. Note that this was performed for both before and after supply of a substance. Cellophane tape was affixed to the surface of the separator in the obtained test specimen. Tape prescribed by JIS Z1522 was used as the cellophane tape. Moreover, the cellophane tape was secured to a horizontal test stage in advance. The stress when the negative electrode was peeled off by pulling one end of the negative electrode vertically upward at a pulling speed of 50 mm/min was then measured. Three measurements were performed in this manner, and an average value of the stress was determined as the dry adhesive force.

<Adhesive Force in Electrolyte Solution>

A negative electrode and a separator were affixed to each other under the same conditions as in production of a laminate and were then cut to 10 mm in width to obtain a test specimen. The test specimen was immersed in electrolyte solution (solvent: ethylene carbonate/diethyl carbonate/vinylene carbonate=68.5/30/1.5 (volume ratio); electrolyte: LiPF$_6$ of 1 M in concentration) at a temperature of 60° C. for 3 days. Thereafter, the test specimen was removed from the electrolyte solution and electrolyte solution attached to the surface thereof was wiped off. The test specimen was then placed with the surface of the negative electrode facing downward and cellophane tape was affixed to the surface of the negative electrode. The cellophane tape was secured to a horizontal test stage in advance. Moreover, tape prescribed by JIS Z1522 was used as the cellophane tape. The stress when the separator was peeled off by pulling one end of the separator vertically upward at a pulling speed of 50 mm/min was then measured. Three measurements were performed in this manner, and an average value of the stress was determined. The obtained average value was evaluated by the following standard as the peel strength in electrolyte solution. A larger peel strength indicates better adhesiveness in electrolyte solution.

A: Peel strength of 0.8 N/m or more
B: Peel strength of not less than 0.6 N/m and less than 0.8 N/m
C: Peel strength of not less than 0.4 N/m and less than 0.6 N/m
D: Peel strength of not less than 0.2 N/m and less than 0.4 N/m
E: Peel strength of less than 0.2 N/m <Process Adhesiveness>

An obtained laminate was subjected to a vibration test using a desktop vibration testing machine (CV-101M produced by AS ONE Corporation). Specifically, the laminate was subjected to a vibration test under conditions of a frequency of 10 Hz, a vibration time of 1 minute, and an amplitude of 0.5 mm, misalignment of the laminate was subsequently measured, and the misalignment was evaluated in accordance with the following standard. Smaller misalignment indicates better process adhesiveness.

A: Post-vibration test misalignment of less than 0.3 mm
B: Post-vibration test misalignment of not less than 0.3 mm and less than 0.5 mm
C: Post-vibration test misalignment of not less than 0.5 mm and less than 0.7 mm
D: Post-vibration test misalignment of not less than 0.7 mm and less than 1 mm
E: Post-vibration test misalignment of 1 mm or more <Cycle Characteristics>

A produced lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was then discharged to a cell voltage of 3.00 V by a 0.2 C constant-current method at a temperature of 25° C. Thereafter, the lithium ion secondary battery was CC-CV (constant current-constant voltage) charged (upper limit cell voltage: 4.20 V) by a 0.2 C constant-current method, was CC discharged to 3.00 V by a 0.2 C constant-current method, and the initial discharge capacity X1 was measured. Next, 50 cycles were carried out of an operation in which the lithium ion secondary battery was charged and discharged between cell voltages of 4.20 V and 3.00 V with a charge/discharge rate of 1.0 C in an environment having a temperature of 45° C. Subsequently, 50 cycles were carried out of an operation in which the lithium ion secondary battery was charged and discharged between cell voltages of 4.20 V and 3.00 V with a charge/discharge rate of 0.5 C in an environment having a temperature of 0° C. Thereafter, the lithium ion secondary battery was CC-CV charged (cell voltage: 4.20 V) by a 0.2 C constant-current method and was discharged to a cell voltage of 3.00 V by a 0.2 C constant-current method at a temperature of 25° C. The discharge capacity X2 was measured. The initial discharge capacity X1 and the discharge capacity X2 were used to determine a capacity maintenance rate expressed by $\Delta C'=(X2/X1)\times 100(\%)$. The capacity maintenance rate was evaluated in accordance with the following standard. A larger capacity maintenance rate $\Delta C$ indicates better cycle characteristics.

A: Capacity maintenance rate $\Delta C$ of 85% or more
B: Capacity maintenance rate $\Delta C$ of not less than 80% and less than 85%
C: Capacity maintenance rate $\Delta C$ of not less than 75% and less than 80%
D: Capacity maintenance rate $\Delta C$ of not less than 70% and less than 75%
E: Capacity maintenance rate $\Delta C$ of less than 70%

Example 1

<Production of Low-Tg Polymer>
A reactor including a stirrer was charged with 70 parts of deionized water, 0.15 parts of polyoxyethylene lauryl ether (EMULGEN® 120 (EMULGEN is a registered trademark in Japan, other countries, or both) produced by Kao Corporation) as an emulsifier, and 0.5 parts of ammonium persulfate. The gas phase was purged with nitrogen gas and heating was performed to 60° C.

Meanwhile, a monomer composition was obtained in a separate vessel by mixing 50 parts of deionized water, 0.5 parts of polyoxyethylene lauryl ether (EMULGEN® 120 produced by Kao Corporation) as an emulsifier, 70 parts of 2-ethylhexyl acrylate (2-EHA), 25 parts of styrene (ST), 1.7 parts of allyl glycidyl ether (AGE), 0.3 parts of allyl methacrylate, and 3 parts of acrylic acid (AA). The monomer composition was continuously added to the reactor A over 4 hours to carry out polymerization. The reaction was carried out at 70° C. during the addition. Once the addition was completed, stirring was performed at 80° C. for a further 3 hours to complete the reaction and produce a water dispersion containing a particulate polymer A.

In measurement of the glass-transition temperature Tg of the obtained particulate polymer A, just one glass-transition temperature Tg ($-20°$ C.) was observed, and the particulate polymer was confirmed to be a random copolymer. The volume-average particle diameter D50 of the obtained particulate polymer A was 200 nm.

<Production of High-Tg Polymer>
A reactor including a stirrer was charged with 100 parts of deionized water and 0.3 parts of ammonium persulfate. The gas phase was purged with nitrogen gas and heating was performed to 80° C.

Meanwhile, a monomer mixture was obtained in a separate vessel by mixing 40 parts of deionized water, 0.2 parts of sodium dodecylbenzenesulfonate, 53.8 parts of styrene, 33 parts of 2-ethylhexyl acrylate, 10 parts of acrylonitrile, 0.2 parts of ethylene glycol dimethacrylate, and 3 parts of methacrylic acid. The monomer mixture was continuously added to the reactor over 4 hours to carry out polymerization. The reaction was carried out at 80° C. during addition of the monomer mixture. Once addition of the monomer mixture was completed, stirring was performed at 80° C. for a further 2 hours and then the reaction was ended to obtain a water dispersion of a particulate high-Tg polymer.

The glass-transition temperature, volume-average particle diameter D50, and degree of swelling in response to a substance of the obtained polymer were measured. The results are shown in Table 1.

<Production of Slurry Composition for Porous Membrane Layer>
Mixing was performed of 86 parts of alumina (produced by Sumitomo Chemical Co., Ltd.; product name: AKP3000; volume-average particle diameter D50: 0.5 μm) as non-conductive particles and 14 parts in terms of solid content of the water dispersion of the high-Tg polymer obtained through the operations described above (alumina:high-Tg polymer (volume ratio)=60:40). In addition, 5 parts in terms of solid content of the water dispersion of the low-Tg polymer, 1.5 parts of polyacrylamide as a thickener, and 0.8 parts of polyacrylic acid as a dispersant were added, deionized water was added to adjust the solid content concentration to 15%, and mixing was performed using a ball mill to produce a slurry composition for a porous membrane layer.

<Production of Separator>
The slurry composition for a porous membrane layer was applied onto a separator substrate (product name: Celgard 2500) made from polypropylene (PP) and was dried at 50° C. for 3 minutes. This operation was performed with respect to both sides of the separator substrate to obtain a separator including porous membrane layers of 5 μm in thickness at both sides.

The blocking resistance of the separator was evaluated. The result is shown in Table 1.

<Production of Negative Electrode>
A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. Once the polymerization conversion rate reached 96%, cooling was performed to quench the reaction to yield a mixture containing a binder (SBR) for a negative electrode mixed material layer. The mixture containing the binder for a negative electrode mixed material layer was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing the target binder for a negative electrode mixed material layer.

Next, 100 parts of artificial graphite (volume-average particle diameter: 15.6 μm) as a negative electrode active material, 1 part in terms of solid content of a 2% aqueous solution of carboxymethyl cellulose sodium salt (produced by Nippon Paper Industries Co., Ltd.; product name: MAC350HC) as a viscosity modifier, and deionized water were mixed, were adjusted to a solid content concentration of 68%, and were subsequently mixed at 25° C. for 60 minutes. These materials were further adjusted to a solid content concentration of 62% with deionized water and were then mixed at 25° C. for a further 15 minutes. Deionized water and 1.5 parts in terms of solid content of the water dispersion containing the binder for a negative electrode mixed material layer described above were added to the resultant mixture, the final solid content concentration was adjusted to 52%, and a further 10 minutes of mixing was performed. The resultant mixture was subjected to a defoaming process under reduced pressure to yield a slurry composition for a secondary battery negative electrode having good fluidity.

The obtained slurry composition for a secondary battery negative electrode was applied onto copper foil (current collector) of 20 μm in thickness using a comma coater such as to have a thickness of approximately 150 μm after drying. The applied slurry composition was dried by conveying the copper foil inside a 60° C. oven for 2 minutes at a speed of 0.5 m/min. Thereafter, 2 minutes of heat treatment was performed at 120° C. to obtain a pre-pressing negative electrode web. The obtained pre-pressing negative electrode web was rolled by roll pressing to obtain a post-pressing negative electrode having a negative electrode mixed material layer thickness of 80 μm.

Dry adhesive force and adhesive force in electrolyte solution were evaluated. The results are shown in Table 1.

<Production of Positive Electrode>

A slurry composition for a secondary battery positive electrode was obtained by combining 100 parts of $LiCoO_2$ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder for a positive electrode mixed material layer, and N-methylpyrrolidone as a solvent such that the total solid content concentration was 70%, and mixing these materials using a planetary mixer.

The obtained slurry composition for a secondary battery positive electrode was applied onto aluminum foil (current collector) of 20 μm in thickness using a comma coater such as to have a thickness of approximately 150 μm after drying. The applied slurry composition was dried by conveying the aluminum foil inside a 60° C. oven for 2 minutes at a speed of 0.5 m/min. Thereafter, 2 minutes of heat treatment was performed at 120° C. to obtain a pre-pressing positive electrode web. The pre-pressing positive electrode web was rolled by a roll press to obtain a post-pressing positive electrode including a positive electrode mixed material layer.

<Production of Laminate>

The post-pressing positive electrode obtained as described above was cut out as a 4 cm×4 cm square. Moreover, the separator obtained as described above was cut out as 5 cm×5 cm. In addition, the post-pressing negative electrode produced as described above was cut out as 4.2 cm×4.2 cm.

A commercially available sprayer was then used to spray limonene (melting point: −74° C.; boiling point: 176° C.) as a substance with respect to both sides of the separator such that the sprayed amount of limonene was 2 g/m².

A laminate was then obtained by overlapping the negative electrode, the separator, and the positive electrode in order. Next, the obtained laminate was adhered through 50 seconds of pressing under conditions of a temperature of 50° C. and a pressure of 1 MPa. A model sample having a thermocouple set up in a central part of the laminate was used to measure the temperature of the central part of the laminate during pressing.

Process adhesiveness was evaluated for the obtained laminate. The result is shown in Table 1.

<Production of Secondary Battery>

The obtained laminate was enclosed in an aluminum packing case serving as a battery case, and electrolyte solution (solvent: ethylene carbonate (EC)/diethyl carbonate (DEC)/vinylene carbonate (VC) (volume ratio)=68.5/30/1.5; electrolyte: $LiPF_6$ of 1 M in concentration) was injected such that no air remained. An opening of the aluminum packing case was heat sealed at a temperature of 150° C. to produce an 800 mAh laminate lithium ion secondary battery.

The cycle characteristics of the produced lithium ion secondary battery were evaluated. The result is shown in Table 1.

Example 2

A low-Tg polymer, a high-Tg polymer, a slurry composition for a porous membrane layer, a separator, a negative electrode, a positive electrode, a laminate, and a secondary battery were produced in the same way as in Example 1 with the exception that the laminate and the lithium ion secondary battery were produced as described below. Evaluations were conducted in the same manner as in Example 1. The results are shown in Table 1.

<Production of Laminate>

First, the separator was cut out as a 120 cm×5.5 cm rectangle and then a commercially available sprayer was used to spray limonene as a substance with respect to both sides of the separator such that the sprayed amount of limonene was 2 g/m².

Next, the post-pressing positive electrode was cut out as a 49 cm×5 cm rectangle and was placed with the surface at the positive electrode mixed material layer side facing upward. The separator (dimensions: 120 cm×5.5 cm) that had been sprayed with the substance was arranged on the positive electrode mixed material layer such that the positive electrode was positioned at the longitudinal direction left-hand side of the separator. In addition, the post-pressing negative electrode was cut out as a 50 cm×5.2 cm rectangle and was arranged on the separator such that the surface at the negative electrode mixed material layer side thereof faced the separator and such that the negative electrode was positioned at the longitudinal direction right-hand side of the separator.

Next, the resultant laminate was adhered through 80 seconds of pressing under conditions of a temperature of 50° C. and a pressure of 1 MPa. A model sample having a thermocouple set up in a central part of the laminate was used to measure the temperature of the central part of the laminate during pressing.

<Production of Secondary Battery>

The obtained laminate was wound by a winding machine to obtain a roll. The obtained roll was enclosed in an aluminum packing case serving as a battery case, and electrolyte solution (solvent: ethylene carbonate (EC)/diethyl carbonate (DEC)/vinylene carbonate (VC) (volume ratio)=68.5/30/1.5; electrolyte: $LiPF_6$ of 1 M in concentration) was injected such that no air remained. An opening of the aluminum packing case was heat sealed at a temperature of 150° C. to produce a wound lithium ion secondary battery having a capacity of 800 mAh.

Example 3

A low-Tg polymer, a high-Tg polymer, a slurry composition for a porous membrane layer, a separator, a negative electrode, a positive electrode, a laminate, and a secondary battery were produced in the same way as in Example 1 with the exception that cymene (melting point: −68° C.; boiling point: 177° C.) was used instead of limonene in production of the laminate. Evaluations were conducted in the same manner as in Example 1. The results are shown in Table 1.

Example 4

A low-Tg polymer, a high-Tg polymer, a slurry composition for a porous membrane layer, a separator, a negative electrode, a positive electrode, a laminate, and a secondary battery were produced in the same way as in Example 1 with the exception that diethylene glycol monobutyl ether (melting point: −68° C.; boiling point: 234° C.) was used instead of limonene and application was performed using a Materials Printer (DMP-2850) produced by FUJIFILM Corporation instead of a commercially available sprayer in production of the laminate. Evaluations were conducted in the same manner as in Example 1. The results are shown in Table 1.

Example 5

A low-Tg polymer, a high-Tg polymer, a slurry composition for a porous membrane layer, a separator, a negative electrode, a positive electrode, a laminate, and a secondary battery were produced in the same way as in Example 1 with the exception that butyl acetate (melting point: −78° C.; boiling point: 126° C.) was used instead of limonene in production of the laminate. Evaluations were conducted in the same manner as in Example 1. The results are shown in Table 1.

Example 6

A low-Tg polymer, a high-Tg polymer, a slurry composition for a porous membrane layer, a separator, a negative electrode, a positive electrode, a laminate, and a secondary battery were produced in the same way as in Example 1 with the exception that xylene (melting point: −25° C.; boiling point: 144° C.) was used instead of limonene in production of the laminate. Evaluations were conducted in the same manner as in Example 1. The results are shown in Table 1.

Example 7

A low-Tg polymer, a high-Tg polymer, a slurry composition for a porous membrane layer, a separator, a negative electrode, a positive electrode, a laminate, and a secondary battery were produced in the same way as in Example 1 with the exception that heptane (melting point: −91° C.; boiling point: 98° C.) was used instead of limonene in production of the laminate. Evaluations were conducted in the same manner as in Example 1. The results are shown in Table 1.

Example 8

A low-Tg polymer, a high-Tg polymer, a slurry composition for a porous membrane layer, a separator, a negative electrode, a positive electrode, a laminate, and a secondary battery were produced in the same way as in Example 1 with the exception that cyclohexane (melting point: 7° C.; boiling point: 81° C.) was used instead of limonene in production of the laminate. Evaluations were conducted in the same manner as in Example 1. The results are shown in Table 1.

Example 9

A low-Tg polymer, a high-Tg polymer, a slurry composition for a porous membrane layer, a separator, a negative electrode, a positive electrode, a laminate, and a secondary battery were produced in the same way as in Example 1 with the exception that benzophenone (melting point: 48° C.; boiling point: 305° C.) that had been ground in a mortar under cooling was sprinkled onto both sides of the separator instead of cyclohexane in production of the laminate. Evaluations were conducted in the same manner as in Example 1. The results are shown in Table 1.

Example 10

A low-Tg polymer, a high-Tg polymer, a slurry composition for a porous membrane layer, a separator, a negative electrode, a positive electrode, a laminate, and a secondary battery were produced in the same way as in Example 1 with the exception that the separator and limonene were loaded into a hermetically sealed vessel made from glass without being in direct contact and were left for 1 hour instead of spraying limonene using a sprayer in production of the laminate. Evaluations were conducted in the same manner as in Example 1. The results are shown in Table 1.

Note that when the weight of the separator was measured before and after being left, the weight per unit area of the separator had increased by 0.005 $g/m^2$.

Example 11

A low-Tg polymer, a high-Tg polymer, a slurry composition for a porous membrane layer, a separator, a negative electrode, a positive electrode, a laminate, and a secondary battery were produced in the same way as in Example 1 with the exception that the sprayed amount of limonene in production of the laminate was changed to 5 $g/m^2$. Evaluations were conducted in the same manner as in Example 1. The results are shown in Table 1.

Example 12

A low-Tg polymer, a high-Tg polymer, a slurry composition for a porous membrane layer, a separator, a negative electrode, a positive electrode, a laminate, and a secondary battery were produced in the same way as in Example 1 with the exception that the amount of styrene was changed to 75.8 parts and the amount of 2-ethylhexyl acrylate was changed to 11 parts in production of the high-Tg polymer. Evaluations were conducted in the same manner as in Example 1. The results are shown in Table 1.

Example 13

A low-Tg polymer, a high-Tg polymer, a slurry composition for a porous membrane layer, a separator, a negative electrode, a positive electrode, a laminate, and a secondary battery were produced in the same way as in Example 1 with the exception that a high-Tg polymer produced as described below was used. Evaluations were conducted in the same manner as in Example 1. The results are shown in Table 1.

<Production of High-Tg Polymer>

A particulate polymer having a core-shell structure was produced as a high-Tg polymer. Specifically, in core portion formation, a 5 MPa pressure-resistant vessel equipped with a stirrer was first charged with 42 parts of methyl methacrylate monomer, 24.5 parts of butyl acrylate, 2.8 parts of methacrylic acid, 0.7 parts of ethylene glycol dimethacrylate, 1 part of sodium dodecylbenzenesulfonate as an emulsifier, 150 parts of deionized water, and 0.5 parts of potassium persulfate as a polymerization initiator, and these materials were sufficiently stirred and were then heated to 60° C. to initiate polymerization. Once the polymerization conversion rate reached 96%, 29.7 parts of styrene and 0.3 parts of methacrylic acid were continuously added for shell portion formation, and polymerization was continued under heating at 70° C. Cooling was performed to quench the reaction once the conversion rate reached 96% to yield a water dispersion containing a particulate polymer having a core-shell structure.

Example 14

A low-Tg polymer, a high-Tg polymer, a slurry composition for a porous membrane layer, a separator, a negative electrode, a positive electrode, a laminate, and a secondary battery were produced in the same way as in Example 13 with the exception that propylene carbonate (melting point: −55° C.; boiling point: 242° C.) was used instead of limonene in production of the laminate. Evaluations were conducted in the same manner as in Example 1. The results are shown in Table 1.

Example 15

A low-Tg polymer, a high-Tg polymer, a slurry composition for a porous membrane layer, a separator, a negative electrode, a positive electrode, a laminate, and a secondary battery were produced in the same way as in Example 1 with the exception that the amount of styrene was changed to 64.0 parts, and acrylonitrile and ethylene glycol dimethacrylate were not used in production of the high-Tg polymer. Evaluations were conducted in the same manner as in Example 1. The results are shown in Table 1.

Example 16

A low-Tg polymer, a high-Tg polymer, a slurry composition for a porous membrane layer, a separator, a negative electrode, a positive electrode, a laminate, and a secondary battery were produced in the same way as in Example 1 with the exception that the amount of 2-ethylhexyl acrylate was changed to 23 parts and the amount of acrylonitrile was changed to 20 parts in production of the high-Tg polymer. Evaluations were conducted in the same manner as in Example 1. The results are shown in Table 1.

Example 17

A low-Tg polymer, a slurry composition for a porous membrane layer, a separator, a negative electrode, a positive electrode, a laminate, and a secondary battery were produced in the same way as in Example 1 with the exception that the amount of alumina was changed to 90 parts and 10 parts of polyvinylidene fluoride-hexafluoropropylene (PVdF-HFP) copolymer (produced by Sigma-Aldrich) was used instead of 14 parts (in terms of solid content) of the water dispersion of the high-Tg polymer in production of the slurry composition for a porous membrane layer. Evaluations were conducted in the same manner as in Example 1. The results are shown in Table 1.

Example 18

A low-Tg polymer, a high-Tg polymer, a slurry composition for a porous membrane layer, a separator, a negative electrode, a positive electrode, a laminate, and a secondary battery were produced in the same way as in Example 1 with the exception that propylene carbonate (melting point: −55° C.; boiling point: 242° C.) was used instead of limonene in production of the laminate. Evaluations were conducted in the same manner as in Example 1. The results are shown in Table 1.

Example 19

A low-Tg polymer, a high-Tg polymer, a slurry composition for a porous membrane layer, a separator, a negative electrode, a positive electrode, a laminate, and a secondary battery were produced in the same way as in Example 1 with the exception that the location sprayed with limonene in production of the laminate was changed from both sides of the separator to the surface of the positive electrode mixed material layer of the positive electrode and the surface of the negative electrode mixed material layer of the negative electrode. Evaluations were conducted in the same manner as in Example 1. The results are shown in Table 1.

Examples 20 and 21

A low-Tg polymer, a high-Tg polymer, a slurry composition for a porous membrane layer, a separator, a negative electrode, a positive electrode, a laminate, and a secondary battery were produced in the same way as in Example 1 with the exception that the pressing temperature in production of the laminate was changed to 30° C. (Example 20) or 20° C. (Example 21). Evaluations were conducted in the same manner as in Example 1. The results are shown in Table 1.

Comparative Example 1

A low-Tg polymer, a high-Tg polymer, a slurry composition for a porous membrane layer, a separator, a negative electrode, a positive electrode, a laminate, and a secondary battery were produced in the same way as in Example 1 with the exception that limonene was not sprayed onto both sides of the separator in production of the laminate. Evaluations were conducted in the same manner as in Example 1. The results are shown in Table 1.

Comparative Example 2

A low-Tg polymer, a high-Tg polymer, a slurry composition for a porous membrane layer, a separator, a negative electrode, a positive electrode, a laminate, and a secondary battery were produced in the same way as in Example 1 with the exception that water (melting point: 0° C.; boiling point: 100° C.) was used instead of limonene in production of the laminate. Evaluations were conducted in the same manner as in Example 1. The results are shown in Table 1.

Comparative Example 3

A low-Tg polymer, a high-Tg polymer, a slurry composition for a porous membrane layer, a separator, a negative electrode, a positive electrode, a laminate, and a secondary battery were produced in the same way as in Example 1 with the exception that ethanol (melting point: −114° C.; boiling point: 78° C.) was used instead of limonene in production of the laminate. Evaluations were conducted in the same manner as in Example 1. The results are shown in Table 1.

Comparative Example 4

A separator, a negative electrode, a positive electrode, a laminate, and a secondary battery were produced in the same way as in Example 1 with the exception that a slurry composition for a porous membrane layer, a separator, and a laminate produced as described below were used. Evaluations were conducted in the same manner as in Example 1. The results are shown in Table 1.

<Production of Slurry Composition for Porous Membrane Layer>

Mixing was performed of 90 parts of alumina (produced by Sumitomo Chemical Co., Ltd.; product name: AKP3000; volume-average particle diameter D50: 0.5 μm) as non-conductive particles and 10 parts of polyvinylidene fluoride-hexafluoropropylene (PVdF-HFP) copolymer (produced by Sigma-Aldrich). In addition, 5 parts in terms of solid content of the water dispersion of the low-Tg polymer, 1.5 parts of polyacrylamide as a thickener, and 0.8 parts of polyacrylic acid as a dispersant were added, deionized water was added to adjust the solid content concentration to 15%, and mixing was performed using a ball mill to produce a slurry composition for a porous membrane layer.

<Production of Separator>

The slurry composition for a porous membrane layer was applied onto a separator substrate (product name: Celgard 2500) made from polypropylene using a bar coater such that the coating weight was 6 g/m$^2$. Thereafter, the separator that had been coated with the solution was left for at least 15 seconds in a constant-temperature constant-humidity space that had been adjusted to a temperature of 25° C. and a humidity of 60% so as to allow moisture absorption (change in weight between before and after being left: 0.01 g/m$^2$).

<Production of Laminate>

The post-pressing positive electrode was cut out as a 4 cm×4 cm square. Moreover, the separator obtained as described above was cut out as 5 cm×5 cm. In addition, the post-pressing negative electrode was cut out as 4.2 cm×4.2 cm.

A laminate was then obtained through stacking in an order of negative electrode/separator/positive electrode/separator. Next, the obtained laminate was loaded into an 80° C. hot-air dryer for 1 hour to affix the positive electrode and the negative electrode to the separators.

TABLE 1

|   |   |   |   | Example 1 | Example 2 | Example 3 | Example 4 | Example 5 | Example 6 |
|---|---|---|---|---|---|---|---|---|---|
| Separator | Separator substrate |   |   | PP | PP | PP | PP | PP | PP |
|   | Porous membrane layer | Non-conductive particles | Alumina [parts by mass] | 86 | 86 | 86 | 86 | 86 | 86 |
|   |   | High-Tg polymer | Glass-transition temperature [° C.] | 48 | 48 | 48 | 48 | 48 | 48 |
|   |   |   | Volume-average particle diameter D50 [μm] | 0.6 | 0.6 | 0.6 | 0.6 | 0.6 | 06 |
|   |   |   | Degree of swelling in response to substance [%] | 800 | 800 | 800 | 800 | 800 | 800 |
|   |   |   | Amount [parts by mass] | 14 | 14 | 14 | 14 | 14 | 14 |
|   |   | Low-Tg polymer | Glass-transition temperature [° C.] | −20 | −20 | −20 | −20 | −20 | −20 |
|   |   |   | Volume-average particle diameter D50 [μm] | 0.2 | 0.2 | 0.2 | 0.2 | 0.2 | 0.2 |
|   |   |   | Degree of swelling in response to substance [%] | 800 | 800 | 800 | 800 | 800 | 800 |
|   |   |   | Amount [parts by mass] | 5 | 5 | 5 | 5 | 5 | 5 |
|   |   | PVdF-HFP | Glass-transition temperature [° C.] | — | — | — | — | — | — |
|   |   |   | Volume-average particle diameter D50 [μm] | — | — | — | — | — | — |
|   |   |   | Degree of swelling in response to substance [%] | — | — | — | — | — | — |
|   |   |   | Amount [parts by mass] | — | — | — | — | — | — |
|   |   | Content of low-Tg polymer/100 parts by mass of high-Tg polymer [parts by mass] |   | 35.7 | 35.7 | 35.7 | 35.7 | 35.7 | 35.7 |
|   |   | Thickness [μm] |   | 5 | 5 | 5 | 5 | 5 | 5 |
|   | Substance | Supplied amount | Limonene [g/m$^2$] | 2 | 2 | — | — | — | — |
|   |   |   | Cymene [g/m$^2$] | — | — | 2 | — | — | — |
|   |   |   | Diethytene glycol monobutyl ether [g/m$^2$] | — | — | — | 2 | — | — |
|   |   |   | Butyl acetate [g/m$^2$] | — | — | — | — | 2 | — |
|   |   |   | Xylene [g/m$^2$] | — | — | — | — | — | 2 |
|   |   |   | Heptane [g/m$^2$] | — | — | — | — | — | — |
|   |   |   | Cyclohexane [g/m$^2$] | — | — | — | — | — | — |
|   |   |   | Benzophenone [g/m$^2$] | — | — | — | — | — | — |
|   |   |   | Propylene carbonate [g/m$^2$] | — | — | — | — | — | — |
|   |   |   | Water [g/m$^2$] | — | — | — | — | — | — |
|   |   |   | Ethanol [g/m$^2$] | — | — | — | — | — | — |
|   |   | Supply conditions | Supply method | Spraying | Spraying | Spraying | Inkjet | Spraying | Spraying |
|   |   |   | Supply surface | Separator | Separator | Separator | Separator | Separator | Separator |

TABLE 1-continued

|  |  |  |  |  |  |  |  |  |
|---|---|---|---|---|---|---|---|---|
|  |  | Adhesive force between affixing surfaces [N/m] | 4 | 4 | 4 | 4 | 4 | 4 |
|  | Adhesive force with electrode | Before substance supply [N/m] | 0.1 | 0.1 | 0.1 | 0.1 | 0.1 | 0.1 |
|  |  | After substance supply [N/m] | 1.3 | 1.3 | 1.3 | 1.3 | 1.3 | 1.3 |
|  |  | Adhesive force ratio (after substance supply/before substance supply) [—] | 13 | 13 | 13 | 13 | 13 | 13 |
| Laminate | Stacking conditions | Temperature [° C.] | 50 | 50 | 50 | 50 | 50 | 50 |
|  |  | Laminate central part temperature [° C.] | 48 | 48 | 49 | 48 | 49 | 49 |
|  |  | Pressing time [s] | 50 | 80 | 50 | 50 | 50 | 50 |
|  |  | Pressing pressure [MPa] | 1 | 1 | 1 | 1 | 1 | 1 |
| Secondary battery | Type |  | Laminate | Wound | Laminate | Laminate | Laminate | Laminate |
| Evaluation | Process adhesiveness |  | A | A | A | A | A | A |
|  | Adhesive force in electrolyte solution |  | A | A | A | A | A | A |
|  | Cycle characteristics |  | A | A | A | A | A | A |

|  |  |  |  | Example 7 | Example 8 | Example 9 | Example 10 | Example 11 | Example 12 |
|---|---|---|---|---|---|---|---|---|---|
| Separator | Separator substrate |  |  | PP | PP | PP | PP | PP | PP |
|  | Porous membrane layer | Non-conductive particles | Alumina [parts by mass] | 86 | 86 | 86 | 86 | 86 | 86 |
|  |  | High-Tg polymer | Glass-transition temperature [° C.] | 48 | 48 | 48 | 48 | 48 | 80 |
|  |  |  | Volume-average particle diameter D50 [μm] | 0.6 | 0.6 | 0.6 | 0.6 | 0.6 | 0.6 |
|  |  |  | Degree of swelling in response to substance [%] | 600 | 700 | 120 | 800 | 800 | 900 |
|  |  |  | Amount [parts by mass] | 14 | 14 | 14 | 14 | 14 | 14 |
|  |  | Low-Tg polymer | Glass-transition temperature [° C.] | −20 | −20 | −20 | −20 | −20 | −20 |
|  |  |  | Volume-average particle diameter D50 [μm] | 0.2 | 0.2 | 0.2 | 0.2 | 0.2 | 0.2 |
|  |  |  | Degree of swelling in response to substance [%] | 600 | 700 | 120 | 800 | 800 | 800 |
|  |  |  | Amount [parts by mass] | 5 | 5 | 5 | 5 | 5 | 5 |
|  |  | PVdF-HFP | Glass-transition temperature [° C.] | — | — | — | — | — | — |
|  |  |  | Volume-average particle diameter D50 [μm] | — | — | — | — | — | — |
|  |  |  | Degree of swelling in response to substance [%] | — | — | — | — | — | — |
|  |  |  | Amount [parts by mass] | — | — | — | — | — | — |
|  |  | Content of low-Tg polymer/100 parts by mass of high-Tg polymer [parts by mass] |  | 35.7 | 35.7 | 35.7 | 35.7 | 35.7 | 35.7 |
|  |  | Thickness [μm] |  | 5 | 5 | 5 | 5 | 5 | 5 |
|  | Substance | Supplied amount | Limonene [g/m²] | — | — | — | 0.005 | 5 | 2 |
|  |  |  | Cymene [g/m²] | — | — | — | — | — | — |
|  |  |  | Diethylene glycol monobutyl ether [g/m²] | — | — | — | — | — | — |
|  |  |  | Butyl acetate [g/m²] | — | — | — | — | — | — |
|  |  |  | Xylene [g/m²] | — | — | — | — | — | — |
|  |  |  | Heptane [g/m²] | 2 | — | — | — | — | — |
|  |  |  | Cyclohexane [g/m²] | — | 2 | — | — | — | — |
|  |  |  | Benzophenone [g/m²] | — | — | 2 | — | — | — |
|  |  |  | Propylene carbonate [g/m²] | — | — | — | — | — | — |
|  |  |  | Water [g/m²] | — | — | — | — | — | — |
|  |  |  | Ethanol [g/m²] | — | — | — | — | — | — |
|  |  | Supply conditions | Supply method | Spraying | Spraying | Sprinkling | Vapor | Spraying | Spraying |
|  |  |  | Supply surface | Separator | Separator | Separator | Separator | Separator | Separator |
|  | Adhesive force between affixing surfaces [N/m] |  |  | 4 | 4 | 4 | 4 | 4 | 0.5 |
|  | Adhesive force with electrode | Before substance supply [N/m] |  | 0.1 | 0.1 | 0.1 | 0.1 | 0.1 | 0.1 |
|  |  | After substance supply [N/m] |  | 1.1 | 1.2 | 0.6 | 0.6 | 1.5 | 0.5 |
|  |  | Adhesive force ratio (after substance supply/before substance supply) [—] |  | 11 | 12 | 6 | 6 | 15 | 5 |
| Laminate | Stacking conditions | Temperature [° C.] |  | 50 | 50 | 50 | 50 | 50 | 50 |
|  |  | Laminate central part temperature [° C.] |  | 49 | 49 | 48 | 48 | 33 | 22 |
|  |  | Pressing time [s] |  | 50 | 50 | 50 | 50 | 50 | 50 |
|  |  | Pressing pressure [MPa] |  | 1 | 1 | 1 | 1 | 1 | 1 |

TABLE 1-continued

| | | | | | | | | |
|---|---|---|---|---|---|---|---|---|
| Secondary battery | Type | | Laminate | Laminate | Laminate | Laminate | Laminate | Laminate |
| Evaluation | Process adhesiveness | | A | A | C | C | A | C |
| | Adhesive force in electrolyte solution | | A | A | C | C | A | C |
| | Cycle characteristics | | A | A | A | A | B | A |

| | | | | Example 13 | Example 14 | Example 15 | Example 16 | Example 17 | Example 18 |
|---|---|---|---|---|---|---|---|---|---|
| Separator | Separator substrate | | | PP | PP | PP | PP | PP | PP |
| | Porous membrane layer | Non-conductive particles | Alumina [parts by mass] | 86 | 86 | 86 | 86 | 90 | 86 |
| | | High-Tg polymer | Glass-transition temperature [° C.] | 64 | 64 | 42 | 60 | — | 48 |
| | | | Volume-average particle diameter D50 [μm] | 0.6 | 0.6 | 0.6 | 0.6 | — | 0.6 |
| | | | Degree of swelling in response to substance [%] | 300 | 700 | 1000 | 500 | — | 300 |
| | | | Amount [parts by mass] | 14 | 14 | 14 | 14 | — | 14 |
| | | Low-Tg polymer | Glass-transition temperature [° C.] | −20 | −20 | −20 | −20 | −20 | −20 |
| | | | Volume-average particle diameter D50 [μm] | 0.2 | 0.2 | 0.2 | 0.2 | 0.2 | 0.2 |
| | | | Degree of swelling in response to substance [%] | 800 | 300 | 800 | 800 | 800 | 300 |
| | | | Amount [parts by mass] | 5 | 5 | 5 | 5 | 5 | 5 |
| | | PVdF-HFP | Glass-transition temperature [° C.] | — | — | — | — | −40 | — |
| | | | Volume-average particle diameter D50 [μm] | — | — | — | — | 0.6 | — |
| | | | Degree of swelling in response to substance [%] | — | — | — | — | 1000 | — |
| | | | Amount [parts by mass] | — | — | — | — | 10 | — |
| | | Content of low-Tg polymer/100 parts by mass of high-Tg polymer [parts by mass] | | 35.7 | 35.7 | 35.7 | 35.7 | — | 35.7 |
| | | Thickness [μm] | | 5 | 5 | 5 | 5 | 5 | 5 |
| | Substance | Supplied amount | Limonene [g/m$^2$] | 2 | — | 2 | 2 | 2 | — |
| | | | Cymene [g/m$^2$] | — | — | — | — | — | — |
| | | | Diethytene glycol monobutyl ether [g/m$^2$] | — | — | — | — | — | — |
| | | | Butyl acetate [g/m$^2$] | — | — | — | — | — | — |
| | | | Xylene [g/m$^2$] | — | — | — | — | — | — |
| | | | Heptane [g/m$^2$] | — | — | — | — | — | — |
| | | | Cyclohexane [g/m$^2$] | — | — | — | — | — | — |
| | | | Benzophenone [g/m$^2$] | — | — | — | — | — | — |
| | | | Propylene carbonate [g/m$^2$] | — | 2 | — | — | — | 2 |
| | | | Water [g/m$^2$] | — | — | — | — | — | — |
| | | | Ethanol [g/m$^2$] | — | — | — | — | — | — |
| | | Supply conditions | Supply method | Spraying | Spraying | Spraying | Spraying | Spraying | Spraying |
| | | | Supply surface | Separator | Separator | Separator | Separator | Separator | Separator |
| | Adhesive force between affixing surfaces [N/m] | | | 1 | 1 | 6 | 3 | 8 | 4 |
| | Adhesive force with electrode | Before substance supply [N/m] | | 0.1 | 0.1 | 0.3 | 0.1 | 0.3 | 0.1 |
| | | After substance supply [N/m] | | 0.5 | 0.8 | 1.6 | 1 | 0.8 | 0.6 |
| | | Adhesive force ratio (after substance supply/before substance supply) [—] | | 5 | 8 | 5.3 | 10 | 2.7 | 6 |
| Laminate | Stacking conditions | Temperature [° C.] | | 50 | 50 | 50 | 50 | 50 | 50 |
| | | Laminate central part temperature [° C.] | | 48 | 25 | 25 | 48 | 8 | 48 |
| | | Pressing time [s] | | 50 | 50 | 50 | 50 | 50 | 50 |
| | | Pressing pressure [MPa] | | 1 | 1 | 1 | 1 | 1 | 1 |
| Secondary battery | Type | | | Laminate | Laminate | Laminate | Laminate | Laminate | Laminate |
| Evaluation | Process adhesiveness | | | C | B | A | A | B | C |
| | Adhesive force in electrolyte solution | | | C | B | A | A | B | C |
| | Cycle characteristics | | | A | A | A | A | A | A |

TABLE 1-continued

| | | | | Example 19 | Example 20 | Example 21 | Comparative Example 1 |
|---|---|---|---|---|---|---|---|
| Separator | Separator substrate | | | PP | PP | PP | PP |
| | Porous membrane layer | Non-conductive particles | Alumina [parts by mass] | 86 | 86 | 86 | 86 |
| | | High-Tg polymer | Glass-transition temperature [° C.] | 48 | 48 | 48 | 48 |
| | | | Volume-average particle diameter D50 [μm] | 0.6 | 0.6 | 0.6 | 0.6 |
| | | | Degree of swelling in response to substance [%] | 800 | 800 | 800 | — |
| | | | Amount [parts by mass] | 14 | 14 | 14 | 14 |
| | | Low-Tg polymer | Glass-transition temperature [° C.] | −20 | −20 | −20 | −20 |
| | | | Volume-average particle diameter D50 [μm] | 0.2 | 0.2 | 0.2 | 0.2 |
| | | | Degree of swelling in response to substance [%] | 800 | 800 | 800 | — |
| | | | Amount [parts by mass] | 5 | 5 | 5 | 5 |
| | | PVdF-HFP | Glass-transition temperature [° C.] | — | — | — | — |
| | | | Volume-average particle diameter D50 [μm] | — | — | — | — |
| | | | Degree of swelling in response to substance [%] | — | — | — | — |
| | | | Amount [parts by mass] | — | — | — | — |
| | | Content of low-Tg polymer/100 parts by mass of high-Tg polymer [parts by mass] | | 35.7 | 35.7 | 35.7 | 35.7 |
| | | Thickness [μm] | | 5 | 5 | 5 | 5 |
| | Substance | Supplied amount | Limonene [g/m²] | 2 | 2 | 2 | — |
| | | | Cymene [g/m²] | — | — | — | — |
| | | | Diethytene glycol monobutyl ether [g/m²] | — | — | — | — |
| | | | Butyl acetate [g/m²] | — | — | — | — |
| | | | Xylene [g/m²] | — | — | — | — |
| | | | Heptane [g/m²] | — | — | — | — |
| | | | Cyclohexane [g/m²] | — | — | — | — |
| | | | Benzophenone [g/m²] | — | — | — | — |
| | | | Propylene carbonate [g/m²] | — | — | — | — |
| | | | Water [g/m²] | — | — | — | — |
| | | | Ethanol [g/m²] | — | — | — | — |
| | | Supply conditions | Supply method | Spraying | Spraying | Spraying | — |
| | | | Supply surface | Electrodes | Separator | Separator | — |
| | Adhesive force between affixing surfaces [N/m] | | | 4 | 4 | 4 | 4 |
| | Adhesive force with electrode | Before substance supply [N/m] | | 0.1 | 0.1 | 0.1 | 0.1 |
| | | After substance supply [N/m] | | 0.8 | 0.8 | 0.6 | 0.1 |
| | | Adhesive force ratio (after substance supply/ before substance supply) [—] | | 8 | 8 | 6 | 1 |
| Laminate | Stacking conditions | Temperature [° C.] | | 50 | 30 | 20 | 50 |
| | | Laminate central part temperature [° C.] | | 48 | 29 | 20 | 49 |
| | | Pressing time [s] | | 50 | 50 | 50 | 50 |
| | | Pressing pressure [MPa] | | 1 | 1 | 1 | 1 |
| Secondary battery | Type | | | Laminate | Laminate | Laminate | Laminate |
| Evaluation | Process adhesiveness | | | B | B | C | E |
| | Adhesive force in electrolyte solution | | | B | B | C | E |
| | Cycle characteristics | | | A | A | A | D |

| | | | | Comparative Example 2 | Comparative Example 3 | Comparative Example 4 |
|---|---|---|---|---|---|---|
| Separator | Separator substrate | | | PP | PP | PP |
| | Porous membrane layer | Non-conductive particles | Alumina [parts by mass] | 86 | 86 | 90 |
| | | High-Tg polymer | Glass-transition temperature [° C.] | 48 | 48 | — |
| | | | Volume-average particle diameter D50 [μm] | 0.6 | 0.6 | — |

TABLE 1-continued

| | | | | | | |
|---|---|---|---|---|---|---|
| | | | Degree of swelling in response to substance [%] | 100 | 100 | — |
| | | | Amount [parts by mass] | 14 | 14 | — |
| | Low-Tg polymer | | Glass-transition temperature [° C.] | −20 | −20 | −20 |
| | | | Volume-average particle diameter D50 [μm] | 0.2 | 0.2 | 0.2 |
| | | | Degree of swelling in response to substance [%] | 100 | 100 | 100 |
| | | | Amount [parts by mass] | 5 | 5 | 5 |
| | PVdF-HFP | | Glass-transition temperature [° C.] | — | — | −40 |
| | | | Volume-average particle diameter D50 [μm] | — | — | 0.6 |
| | | | Degree of swelling in response to substance [%] | — | — | 100 |
| | | | Amount [parts by mass] | — | — | 10 |
| | Content of low-Tg polymer/100 parts by mass of high-Tg polymer [parts by mass] | | | 35.7 | 35.7 | — |
| | | | Thickness [μm] | 5 | 5 | 5 |
| | Substance | Supplied amount | Limonene [g/m²] | — | — | — |
| | | | Cymene [g/m²] | — | — | — |
| | | | Diethytene glycol monobutyl ether [g/m²] | — | — | — |
| | | | Butyl acetate [g/m²] | — | — | — |
| | | | Xylene [g/m²] | — | — | — |
| | | | Heptane [g/m²] | — | — | — |
| | | | Cyclohexane [g/m²] | — | — | — |
| | | | Benzophenone [g/m²] | — | — | — |
| | | | Propylene carbonate [g/m²] | — | — | — |
| | | | Water [g/m²] | 2 | — | 0.01 |
| | | | Ethanol [g/m²] | — | 2 | — |
| | | Supply conditions | Supply method | Spraying | Spraying | Vapor |
| | | | Supply surface | Separator | Separator | Separator |
| | Adhesive force between affixing surfaces [N/m] | | | 4 | 4 | 8 |
| | Adhesive force with electrode | Before substance supply [N/m] | | 0.1 | 0.1 | 0.3 |
| | | After substance supply [N/m] | | 0.1 | 0.1 | 0.3 |
| | | Adhesive force ratio (after substance supply/before substance supply) [—] | | 1 | 1 | 1 |
| Laminate | Stacking conditions | Temperature [° C.] | | 50 | 50 | 80 |
| | | Laminate central part temperature [° C.] | | 49 | 48 | 80 |
| | | Pressing time [s] | | 50 | 50 | 3600 |
| | | Pressing pressure [MPa] | | 1 | 1 | — |
| Secondary battery | Type | | | Laminate | Laminate | Laminate |
| Evaluation | Process adhesiveness | | | E | D | A |
| | Adhesive force in electrolyte solution | | | E | D | C |
| | Cycle characteristics | | | A | A | E |

It can be seen from Table 1 that a laminate having excellent process adhesiveness was obtained in Examples 1 to 21 in which a substance that could plasticize a polymer was used, compared to Comparative Examples 1 to 3 in which a substance that could plasticize a polymer was not used. It can also be seen that a laminate having excellent process adhesiveness was efficiently obtained in a short time in Examples 1 to 21 compared to Comparative Example 4 in which affixing was performed for a long time without using a substance that could plasticize a polymer.

INDUSTRIAL APPLICABILITY

Through the presently disclosed method of producing a laminate for a non-aqueous secondary battery, it is possible to efficiently obtain a laminate for a non-aqueous secondary battery having excellent process adhesiveness.

Moreover, through the presently disclosed method of producing a non-aqueous secondary battery, a non-aqueous secondary battery that can display excellent performance is efficiently obtained using a laminate for a non-aqueous secondary battery having excellent process adhesiveness.

The invention claimed is:

1. A method of producing a laminate for a non-aqueous secondary battery including an electrode and a separator that are affixed to each other, comprising:

A step (A) of preparing, at least one of the electrode and the separator having an affixing surface;

a step (B) of supplying, at least to the affixing surface, a substance that can plasticize a polymer mixture contained in a surface layer part at an affixing surface side of at least one of the electrode and the separator; and a step (C) of affixing the electrode and the separator to each other after the step (B), wherein the polymer mixture includes a first polymer having a glass-transition temperature of 30° C. or higher and a second polymer having a glass-transition temperature of lower than 30° C., wherein the polymer mixture has a degree of swelling in response to the substance of not less than 500% and not more than 2,000%.

2. The method of producing a laminate for a non-aqueous secondary battery according to claim 1, wherein the substance is supplied in an amount of not less than 0.005 g/m$^2$ and not more than 5 g/m$^2$ in the step (B).

3. The method of producing a laminate for a non-aqueous secondary battery according to claim 1, wherein the separator contains the polymer mixture in a surface layer part at an affixing surface side, and adhesive force between the electrode and the separator before supply of the substance in the step (B) is 8 N/m or less.

4. The method of producing a laminate for a non-aqueous secondary battery according to claim 1, wherein adhesive force between the electrode and the separator after supply of the substance in the step (B) is at least 1.2 times adhesive force between the electrode and the separator before supply of the substance in the step (B).

5. A method of producing a non-aqueous secondary battery comprising:
   a step of producing a laminate for a non-aqueous secondary battery using the method of producing a laminate for a non-aqueous secondary battery according to claim 1; and
   a step of assembling a non-aqueous secondary battery using the laminate for a non-aqueous secondary battery and an electrolyte solution.

* * * * *